(12) United States Patent
Pascal et al.

(10) Patent No.: US 11,987,372 B2
(45) Date of Patent: May 21, 2024

(54) SYSTEM WITH LOCKING INDICATOR FOR A NACELLE ELEMENT, COMPRISING A REMOVABLE KEY FOR LOCKING AND CONTROLLING THE INDICATOR

(71) Applicant: SAFRAN NACELLES, Gonfreville-l'Orcher (FR)

(72) Inventors: Sébastien Laurent Marie Pascal, Moissy-Cramayel (FR); Alexandre Phi, Moissy-Cramayel (FR); Vincent Jean-François Peyron, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 151 days.

(21) Appl. No.: 17/616,422

(22) PCT Filed: Jun. 2, 2020

(86) PCT No.: PCT/FR2020/050937
§ 371 (c)(1),
(2) Date: Dec. 3, 2021

(87) PCT Pub. No.: WO2020/245535
PCT Pub. Date: Dec. 10, 2020

(65) Prior Publication Data
US 2022/0250757 A1 Aug. 11, 2022

(30) Foreign Application Priority Data
Jun. 4, 2019 (FR) .................................. 19 05907

(51) Int. Cl.
*B64C 7/02* (2006.01)
*B64D 29/06* (2006.01)
*B64D 43/00* (2006.01)

(52) U.S. Cl.
CPC ................ *B64D 29/06* (2013.01); *B64C 7/02* (2013.01); *B64D 43/00* (2013.01)

(58) Field of Classification Search
CPC .................................. B64C 7/02; B64D 29/08
See application file for complete search history.

(56) References Cited

U.S. PATENT DOCUMENTS

| 2008/0036596 A1* | 2/2008 | Auerbach | ............. | G09F 3/0329 |
| | | | | 340/542 |
| 2009/0173823 A1 | 7/2009 | Shetzer | | |

(Continued)

FOREIGN PATENT DOCUMENTS

| EP | 2 829 474 B1 | 11/2018 |
| FR | 2 920 144 A1 | 2/2009 |

(Continued)

OTHER PUBLICATIONS

International Search Report dated Sep. 25, 2020 in PCT/FR2020/050937 filed Jun. 2, 2020, 2 pages.

(Continued)

*Primary Examiner* — Nicholas McFall
(74) *Attorney, Agent, or Firm* — Oblon, McClelland, Maier & Neustadt, L.L.P.

(57) ABSTRACT

An assembly including a nacelle element, such as a cover, a device for locking the nacelle element, a key for locking/unlocking the locking device and an indicator for indicating the position of the locking device. This assembly includes a control device which is configured to be actuated by the key when the key is withdrawn from the locking device so as to make the indicator move from a first state to a second state, the state of the indicator being representative of the locked or unlocked position of the locking device.

9 Claims, 4 Drawing Sheets

(56) References Cited

U.S. PATENT DOCUMENTS

| | | | |
|---|---|---|---|
| 2011/0018741 A1 | 1/2011 | Grichener et al. | |
| 2015/0184544 A1* | 7/2015 | Fabre ................. | B64D 29/06 244/54 |
| 2018/0245371 A1* | 8/2018 | Hernandez ............ | B64D 29/06 |
| 2019/0127075 A1* | 5/2019 | Fleming ................ | B64D 29/06 |

FOREIGN PATENT DOCUMENTS

| | | |
|---|---|---|
| FR | 3 007 390 A1 | 12/2014 |
| FR | 3 015 953 A1 | 7/2015 |
| RU | 2 682 145 C1 | 3/2019 |
| WO | WO 85/03971 A1 | 9/1985 |

OTHER PUBLICATIONS

Preliminary French Search Report dated Nov. 13, 2019 in French Patent Application No. 1905907 filed Jun. 4, 2019, 2 pages, (with Translation of Categories).
Combined Russian Office Action and Search issued on Oct. 12, 2023 in Russian Patent Application No. 2021137976 (with English translation of Office Action only), 7 pages.

* cited by examiner

Generate at least one signal when the control device is at least one of deactivated and activated — 7000

Figure 7

Move the locking devices from the unlocking position to the locking position with the corresponding keys — 8001

Withdraw the keys from the locking devices — 8002

Insert the keys into the corresponding switches of the control device — 8003

Move with the aid of the corresponding key each of the switches from the closed position to the open position — 8004

Figure 8

SYSTEM WITH LOCKING INDICATOR FOR A NACELLE ELEMENT, COMPRISING A REMOVABLE KEY FOR LOCKING AND CONTROLLING THE INDICATOR

TECHNICAL FIELD

The invention relates to the field of devices for locking a nacelle element of an aircraft propulsion unit, for example a moveable nacelle element such as a fan cowl. The invention more specifically relates to the detection by a pilot or an operator of the effective locking of such a nacelle element.

PRIOR ART

An aircraft propulsion unit nacelle usually comprises cowls that are moveable between a flight position, wherein they ensure an aerodynamic continuity with the other cowling elements of the nacelle, and a maintenance position making it possible for an operator to access the engine to perform a maintenance operation.

To lock the cowls in flight position, these are equipped with locking devices such as that described in FR 3 015 953 A1.

Before a flight mission, it is necessary to make sure that the moveable cowls are correctly locked in flight position and the aeronautical certification authorities particularly require a reliable means for detecting this locking.

The locking device described in FR 3 015 953 A1 comprises to this end a key equipped with a pennant (see FIG. 9 of this document, reference 160) intended to improve its visibility and to thus reduce the risk of forgetting to lock and to withdraw the key after locking.

Such a detection means requires an in situ visual inspection that does not make it possible for the pilot to ensure correct locking of the cowls during the pre-take-off check procedure, this being performed within the cockpit.

Another conventional technique involves emitting a visual signal in the cockpit while the latches of the cowls are not locked. Examples of such a technique are described in FR 3 007 390 A1, EP 2 829 474 B1 and US 2011/0018741 A1.

Conventional techniques for emitting visual signals require an expensive software system for processing signals, as well as a system for conveying signals between the latches and the cockpit, typically via harnesses, which particularly increases the mass of the aircraft.

DISCLOSURE OF THE INVENTION

The aim of the invention is to procure a system capable of providing an indication of locking or of non-unlocking that is reliable, while remedying the aforementioned drawbacks.

To this end, the object of the invention is an assembly for aircraft, this assembly comprising:
- a first nacelle element such as a cowl that can be placed in a flight position in relation to a second nacelle element,
- a locking device moveable between a locking position able to maintain the first nacelle element in flight position and an unlocking position able to release the first nacelle element,
- a key configured to cooperate with the locking device in such a way as to move it between the locking position and the unlocking position, the key being able to be withdrawn from the locking device only when it is in locking position,
- an indicator for indicating the position of the locking device, this indicator being able to take a first and second state.

According to the invention, this assembly comprises a control device configured to be activated and/or deactivated by said key when it is withdrawn from the locking device, the activation of the control device resulting in moving the indicator from the first to the second state.

Such an assembly, or system, makes it possible to provide a reliable locking indication.

On the one hand indeed, the change of state of the indicator results in a change of state of the control device under the action of the key that is used to lock or unlock the locking device when it is withdrawn from the locking device, that is to say no longer cooperates with it, this key being only able to be withdrawn from the locking device when it is in locking position.

The control device may indeed take an activation state—control device activated—and a deactivation state—control device deactivated. Moving from the deactivation state to the activation state resulting in moving the indicator from the first to the second state.

On the other hand, the invention does not require connecting the locking device to the indicator or to the control device, which makes it possible to eliminate the need for any system for conveying signals between the locking device and the indicator, or between the locking and control devices, and to eliminate the need for any software system for processing the corresponding signal.

The locking device may be a conventional locking device such as that described in FR 3 015 953 A1.

Said unlocking position of the locking device is a position for modifying the position of said first nacelle element, with or without additional action on the locking device.

For example, the locking device may be configured in such a way as to remain in an engaging configuration when it is moved between the locking position and the unlocking position, configuration wherein an element of this device maintains the first nacelle element in flight position. In this example, the locking device may be configured to be placed, from the unlocking position, in a disengaging configuration wherein the first nacelle element is released and may consequently be moved from the flight position to another position. Moving from the engaging configuration to the disengaging configuration may be performed with or without action of an operator on the key. Of course, the key cannot be withdrawn from the locking device when it is in the disengaging position.

According to a first alternative embodiment, the control device may be configured to be actuated mechanically by the key.

In other words, the control device may be configured to be activated and/or deactivated by moving an element of this control device with the key.

According to a second alternative embodiment, the control device may be configured to be actuated remotely by the key, for example by radio-identification.

In the case of remote actuation, it is necessary to configure the control device and the locking device, and/or configure the key, so that the key cannot communicate with the control device when it is not withdrawn from the locking device.

In one embodiment, the control device may be configured so that the key cannot be withdrawn from the control device when it is in the second position.

Such a configuration prevents use of the key to unlock the locking device when the control device is activated, thus avoiding the indicator from being in the second state when the locking device is not locked.

In one embodiment, the control device may comprise a switch.

The switch may constitute said element of the control device moved by the key in such a way as to activate/deactivate the control device.

A switch is a simple and effective means for modifying the state of the indicator. For example, the switch may be configured to close an electric circuit belonging to the control device so that this control device is deactivated, resulting in placing or maintaining the indicator in the first state. Correlatively, such a switch may be configured to open this circuit so that the control device is activated, resulting in placing or maintaining the indicator in the second state.

In one embodiment, the indicator may be a visual indicator.

According to a first variant of visual indicator, it may preferably be a light indicator.

In a non-limiting manner, the light indicator may be configured to generate an alarm colour such as red when the indicator is in the first state, and to not generate any light signal when the indicator is in the second state. To this end, the indicator may for example comprise a light-emitting diode emitting such an alarm colour when an electric current passes through it.

According to a second variant of visual indicator, this may comprise a screen configured to display a textual message.

For example, when the indicator is in the first state, it may be displayed on such a screen a textual message indicating that the locking device or more generally that the corresponding nacelle element is not locked, this message not being displayed when the indicator is in the second state.

Another object of the invention is an aircraft comprising at least one assembly as defined above.

In one embodiment wherein the aircraft comprises a cockpit, said indicator of the at least one assembly may be configured to generate in the cockpit a first signal when this indicator is in the first state and/or a second signal when this indicator is in the second state.

For example, the indicator may be configured to generate in the cockpit a signal taking the form of an alarm colour or of a textual message when the indicator is in the first state, and to not generate any signal when the indicator is in the second state.

In one embodiment, the aircraft may comprise a plurality of assemblies as defined above, the indicator of each of these assemblies being an indicator common to these assemblies.

The result thereof is a simplification of the operation for controlling the locking of said first nacelle elements belonging to these various assemblies, the locking or the absence of locking of these first nacelle elements being indicated by a single indicator.

In one embodiment, the aircraft may comprise at least one first and one second assembly as defined above, the key of the first assembly being incompatible with the locking device and/or the control device of the second assembly, the key of the second assembly being incompatible with the locking device and/or the control device of the first assembly.

In an alternative embodiment wherein the aircraft comprises at least one first and one second assembly as defined above, the key of the first assembly may be compatible with the control device of the second assembly and the key of the second assembly compatible with the control device of the first assembly, the control devices of these assemblies being configured so that the placement in said second state of an indicator common to these assemblies requires each of these control devices to be activated.

Another object of the invention is a method for locking a nacelle element of an assembly as defined above, this method comprising:
  a step of moving the locking device from the unlocking position to the locking position with the key,
  a step of withdrawing the key from the locking device,
  a step of activating the control device with the key.

Another object of the invention is a method for generating at least one signal for indicating the position of a locking device of an assembly as defined above, this method comprising a step of generating at least one signal when the control device of this assembly is deactivated and/or activated.

For example, said at least one signal may comprise a first and a second signal, the first signal being generated when the control device is deactivated, the at least one second signal being generated when the control device is activated.

Other advantages and features of the invention will become apparent upon reading the following non-limiting detailed description.

BRIEF DESCRIPTION OF THE DRAWINGS

The following detailed description refers to the appended drawings wherein.

DETAILED DESCRIPTION OF EMBODIMENTS

Figure 1:
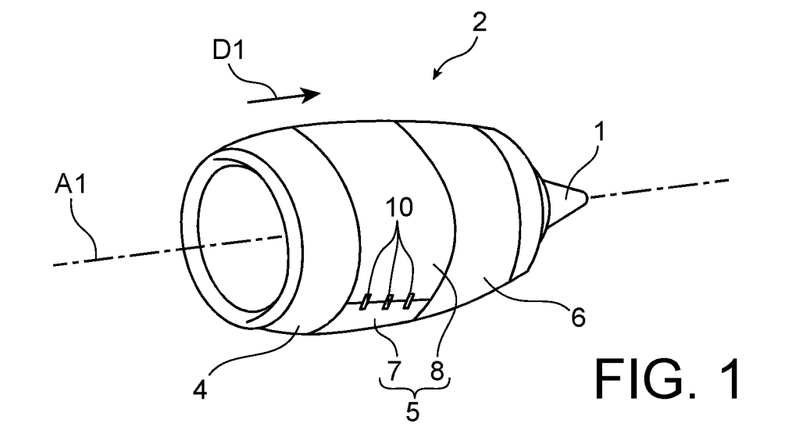
FIG. 1 is a schematic perspective view of an aircraft propulsion unit nacelle, this nacelle comprising two fan cowls in flight position.
Figure 2:
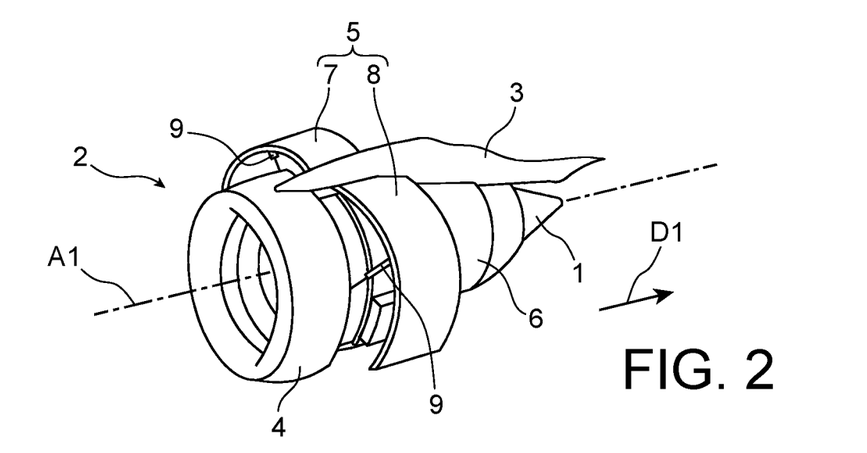
FIG. 2 is a schematic perspective view of the nacelle of FIG. 1, the fan cowls being in maintenance position.

FIGS. 1 and 2 show an aircraft propulsion unit comprising a turbomachine 1 and a nacelle 2 having a longitudinal central axis A1. This propulsion unit is intended to be connected to the wing of the aircraft (not shown) through a pylon 3 partially shown in FIG. 2. By way of non-limiting example, the turbomachine 1 may be a double-flow and double-body turbojet.

Subsequently, the terms "upstream" and "downstream" are defined in relation to a direction D1 of flow of the gases through the propulsion unit when it is propelled.

In a manner known per se, the nacelle 2 comprises from upstream to downstream an air intake 4, an intermediate section 5 surrounding the fan (not shown) of the turbomachine 1 and a rear section 6 that may typically protect the reverse thrust means.

The intermediate section 5 comprises in this example two fan cowls 7 and 8, moveable between a flight position and a maintenance position.

FIG. 1 shows the cowls 7 and 8 in flight position wherein they are closed in such a way as to ensure an aerodynamic continuity with the air intake 4 and the rear section 6.

FIG. 2 shows the cowls 7 and 8 in maintenance position wherein they are open, in such a way as to make it possible for an operator to perform a maintenance operation on the turbomachine 1 without dismantling the intermediate section 5.

The cowls 7 and 8 are each articulated at the pylon 3 about an axis substantially parallel to the longitudinal central axis A1, for their movement between the flight and maintenance positions.

In this example, the nacelle 2 comprises cylinders 9 configured to move the cowls 7 and 8 from one to the other of the flight and maintenance positions and maintain them in maintenance position.

Figure 3:
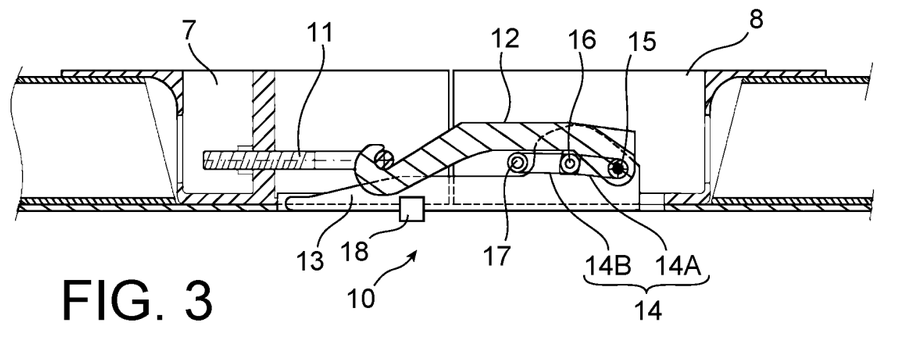
FIG. 3 is a schematic axial sectional view of a locking device for a cowl of an aircraft propulsion unit nacelle.

To maintain and lock the cowls 7 and 8 in flight position, in particular during a flight mission of the aircraft, these are in this example equipped with three locking devices 10 such as that shown in FIG. 3.

The locking device 10 of FIG. 3 comprises on the one hand a latching element 11 integral with the cowl 7 and, on the other hand, a hook 12 and a handle 13 connected to the cowl 8 through a double link 14.

More specifically, the hook 12 and the handle 13 are rotatable in relation to one another about an axis of rotation 15 and are supported by one of the links 14A which is rotatable about an axis of rotation 16 in relation to the other link 14B, the latter itself being rotatable in relation to the cowl 8 about an axis of rotation 17.

Such a locking device 10 makes it possible to move from the engaging configuration illustrated in FIG. 3, wherein the hook 12 cooperates with the latching element 11, to a disengaging configuration (not shown) wherein the hook 12 and the latching element 11 are separated from one another, under the action of a movement of the handle 13 in relation to the cowl 8.

The disengaging configuration (not shown) makes it possible to move the cowls 7 and 8 in relation to one another in order to place them in the maintenance position illustrated in FIG. 2.

To block the locking device 10 in the engaging configuration (FIG. 3) and avoid an untimely movement of the cowls 7 and 8, for example under the action of vibrations to which the propelled nacelle 2 is subjected, the device 10 comprises a latch 18 with key for moving this device from a locking position to an unlocking position.

In this example, the latch 18 is configured to prevent the movement of the handle 13 in relation to the cowl 7 when the locking device 10 is in locking position and to authorise such a movement when the locking device 10 is in unlocking position.

Thus, to lock the cowls 7 and 8 in flight position from an initial configuration wherein the locking device 10 is in disengaging configuration and in unlocking position, the handle 13 is actuated so as to make the hook 12 cooperate with the latching element 11 in order to place the locking device 10 in engaging configuration, then the locking device 10 is placed in locking position with the aid of the key.

Reciprocally, to unlock the cowls 7 and 8 in order to place them in maintenance position from an initial configuration wherein the locking device 10 is in engaging configuration and in locking position, the locking device 10 is placed in unlocking position with the aid of the key then the handle 13 is actuated in such a way as to separate the hook 12 from the latching element 11 in order to place the locking device 10 in disengaging configuration.

The result of the aforementioned is that the key is configured to cooperate with the latch 18 of the locking device 10 in such a way as to move the locking device 10 between the locking position and the unlocking position.

For safety reasons, the locking device 10 is configured so that the key cannot be withdrawn from the latch 18 when this device is in unlocking position, and more specifically to authorise such a withdrawal only when the device 10 is in locking position.

In addition, the locking device 10 of FIG. 3 may only be locked when it is in engaging configuration, when the hook 12 and the latching element 11 are integral with one another.

The locking device 10 of FIG. 3 is given by way of non-limiting example. Any other locking device 10 with conventional key may be used, by conditioning the withdrawal of the key on the placement of the locking device 10 in locking position.

In this example, the key of each of the three locking devices 10 is incompatible with the other two locking devices 10.

More specifically, the invention relates to an assembly for checking, via an indicator 20 preferably visual, that the locking devices 10 are effectively locked.

Figure 4:
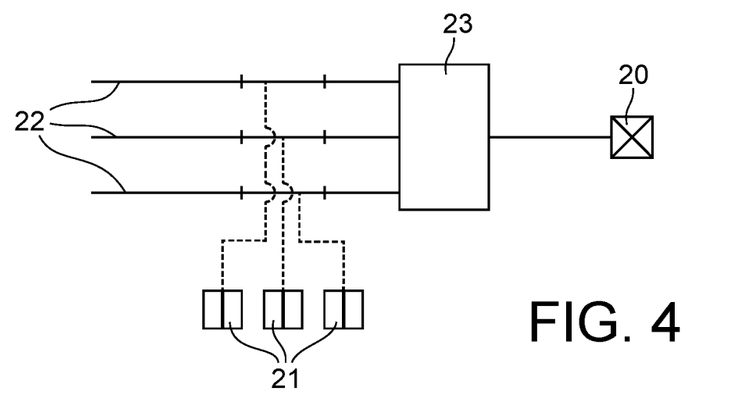
FIG. 4 is a schematic view of a control device of an indicator of an assembly in accordance with the invention, the control device being deactivated.
Figure 5:
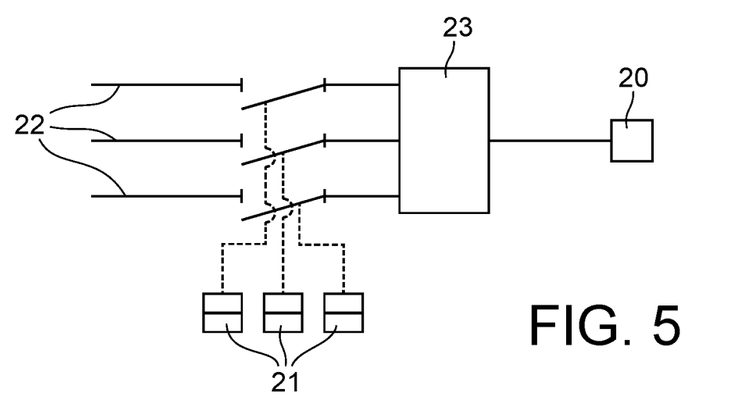
FIG. 5 is a schematic view of the control device of FIG. 4, the control device being activated.

In the embodiment of FIGS. 4 and 5, it is provided three switches 21 configured to control a common indicator 20.

In this example, the indicator 20 is a light indicator of the light-emitting diode type that may take two different states.

In a first state, the light indicator 20 generates a light signal, for example red colour. In a second state, the light indicator 20 does not generate any light signal.

Each of the switches 21 is configured to be moved between a closed position and an open position, with the aid of one of the respective keys of the locking devices 10. In other words, it is provided in this example to associated a switch 21 with a respective locking device 10, so that the key of a given locking device 10 is only compatible with the corresponding switch 21.

With reference to FIG. 4 wherein each of the switches 21 is placed in the closed position, each of these switches 21 authorises a circulation of electric current in a corresponding branch 22 of a circuit connected to the indicator 20 through a computation member 23.

With reference to FIG. 5 wherein each of the switches 21 is placed in the open position, each of these switches 21 opens the corresponding branch 22 in such a way as to prevent therein a circulation of electric current.

The computation member 23 is configured so that the light indicator 20 is passed through by an electric current if and only if each of the switches 21 is placed in closed position.

Figure 7:
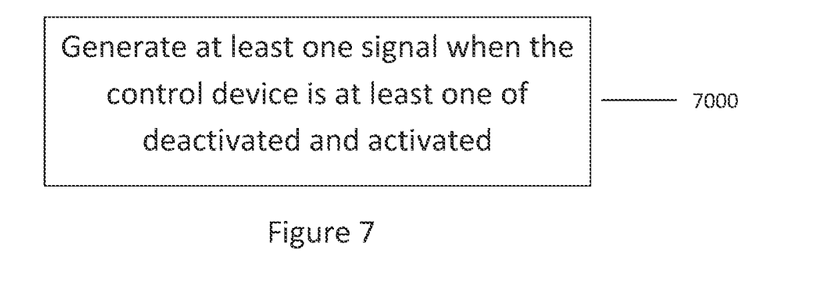
FIG. 7 is an embodiment of a method for generating a signal indicating a position of the locking device in accordance with the invention.

The switches 21, the circuit 22 and the computation member 23 thus form a control device of the indicator 20, this control device being able to be activated or deactivated. The control device is deactivated when one at least of the switches 21 is in the closed position, resulting in placing or maintaining the indicator 20 in the first state (e.g. generation of a light signal). The control device is activated when all of the switches 21 are in the open position, resulting in placing or maintaining the indicator 20 in the second state (e.g. no generation of light signal). As shown in step 7000 of FIG. 7, at least one signal is generated when the control device is at least one of deactivated and activated.

Optionally, a key cannot be withdrawn from a respective switch 21 when it is in the open position. Thus, more generally, a key cannot be withdrawn from the control device when it is activated and therefore when the indicators 20 is in the second state.

In all cases, the withdrawal of a key from its switch 21 results in placing this switch 21 in closed position or is only possible when this switch 21 is in closed position.

Such a control device makes it possible to place the indicator 20 in the first state (for example generation of a light signal) when the key of the at least one of the locking devices 10 is not inserted into the control device, and therefore a fortiori when the key is retained in the corresponding locking device 10 in unlocking position.

The visual indicator 20 produces in this example a red light signal representing an alarm of non-locking of the assembly of the locking devices 10, that is to say indicating that one at least of the locking devices 10 is not locked. When the indicator 20 is in the second state, the absence of light signal indicates that all of the locking devices 10 are locked.

The state of the indicator 20 may be associated with any other combination of stimuli. For example, the indicator 20 may generate a red light signal when it is in the first state and a green light signal when it is in the second state.

In addition, the indicator 20 may take any other form. For example, in an embodiment not shown, the indicator 20 may comprise a screen textually indicating that one at least of the locking devices 10 is not locked when the control device is deactivated and/or that all of the locking devices 10 are locked when the control device is activated. In another embodiment, the indicator 20 may be a sound indicator.

Figure 6:
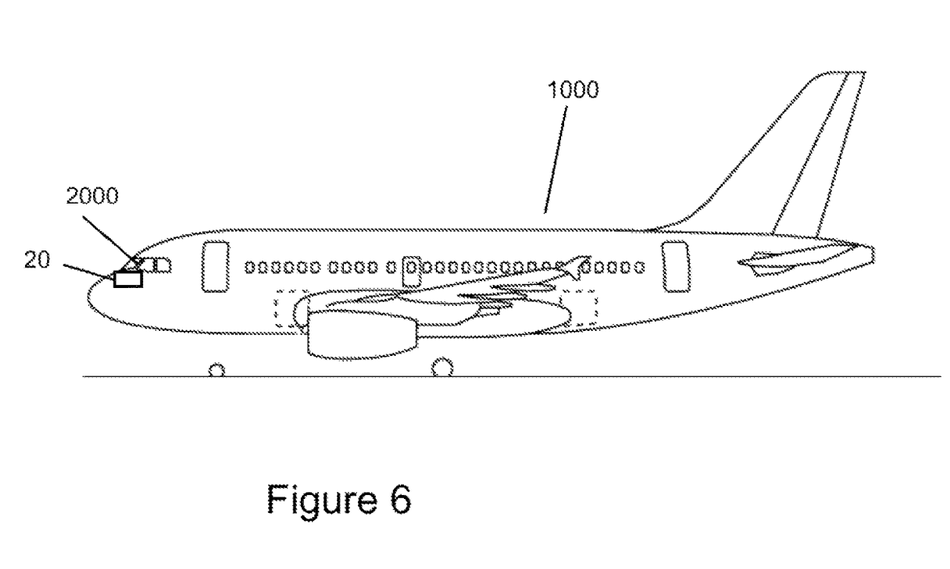
FIG. 6 is a schematic view of an airplane including the control device.

To facilitate the checking procedure prior to a flight mission, the indicator 20 as well as the control device are placed in the cockpit 2000 of the aircraft 1000, as shown in FIG. 6.

Figure 8:
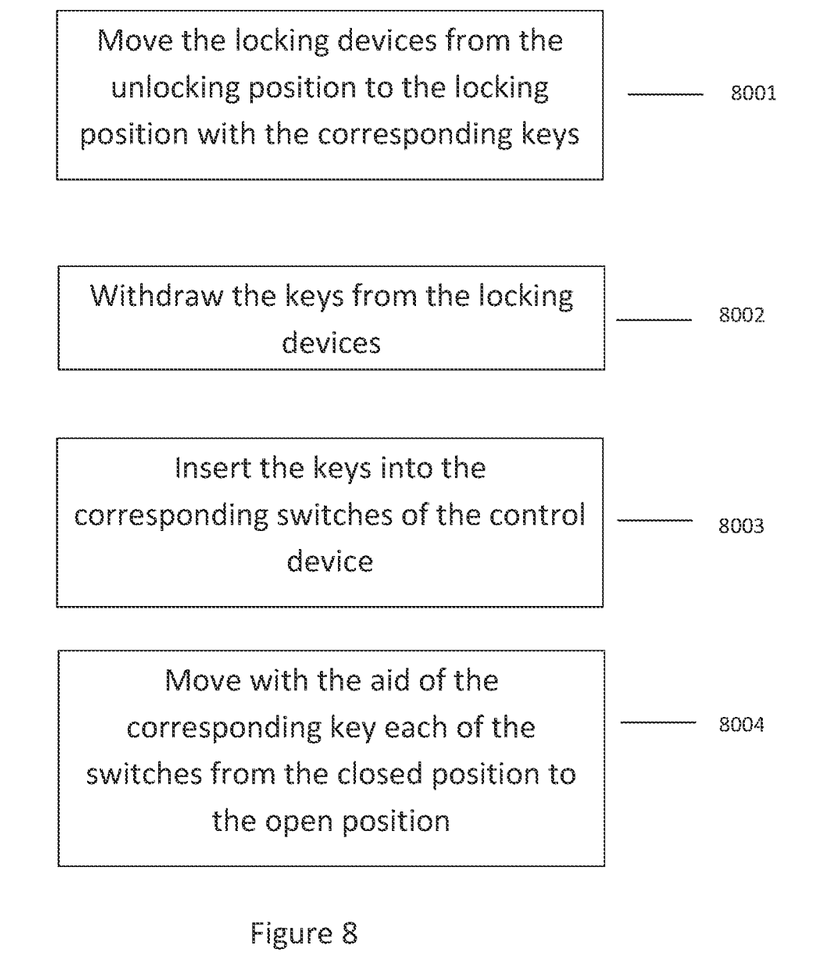
FIG. 8 is an embodiment of a method for locking a nacelle element in accordance with the invention.

With reference to the embodiment of FIGS. 4 and 5, a procedure for locking the cowls 7 and 8 and for checking this locking shown in FIG. 8 successively comprises:

a step 8001 of moving the locking devices 10 from the unlocking position to the locking position with the corresponding keys, a step 8002 of withdrawing the keys from these locking devices 10, a step 8003 of inserting these keys into the corresponding switches 21 of the control device, a step 8004 of moving with the aid of the corresponding key each of the switches 21 from the closed position to the open position.

In the embodiment described above with reference to FIGS. 4 and 5, a given key is only compatible with a single locking device 10 and a single corresponding switch 21, which makes it possible to improve the safety of the locking and locking checking procedure. Of course, the invention may be implemented with interchangeable keys, compatible with a plurality of locking devices 10 and a plurality of corresponding switches 21.

Furthermore, the indicator 20 may be an indicator specific to a control device comprising a single switch 21, that is to say more generally to a control device the state of which may be modified by a single key of a corresponding locking device 10, that is to say being able to be activated and/or deactivated with this single key (not shown).

Moreover, the invention applies to the locking of any other nacelle element equipped with such a locking device 10 with key, this nacelle element being preferably moveable. For example, the nacelle element to be locked may be a moveable element of a thrust reverser of the nacelle 2 (not shown).

The invention claimed is:

1. An assembly for aircraft, said assembly comprising:

a first nacelle element that can be placed in a flight position in relation to a second nacelle element, the first nacelle element and the second nacelle element each being a cowl, a locking device moveable between a locking position able to maintain the first nacelle element in flight position and an unlocking position able to release the first nacelle element, a key configured to cooperate with the locking device in such a way as to move the locking device between the locking position and the unlocking position, the key being able to be withdrawn from the locking device only when the locking device is in locking position, an indicator for indicating the position of the locking device, said indicator being able to take a first state and second state, and a control device configured to be at least one of activated and deactivated by said key when the key is withdrawn from the locking device, the activation of the control device resulting in moving the indicator from the first state to the second state, wherein the indicator is a visual indicator, wherein the control device comprises a circuit including a switch configured to be moved by the key between an open position and a closed position, a branch, and a computation member electrically connected to the indicator, and wherein in the closed position of the switch, electric current circulates through the branch to the computation member such that the indicator is in the first state, and in the open position of the switch, the electric current does not circulate through the branch to the computation member such that the indicator is in the second state.

2. The assembly according to claim 1, wherein the visual indicator is a light, and in the first state, the light is a first color.

3. The assembly according to claim 2, wherein in the second state, the light is a second color.

4. The assembly according to claim 2, wherein in the second state, the light is off.

5. An aircraft comprising at least one assembly according to claim 1.

6. The aircraft according to claim 5, said aircraft comprising a cockpit, said indicator of the at least one assembly being configured to generate in the cockpit a first signal when said indicator is in the first state and a second signal when said indicator is in the second state.

7. The aircraft according to claim 5, said aircraft comprising a plurality of assemblies, the indicator of each assembly being a same common indicator which is common to the plurality of assemblies.

8. A method for locking a nacelle element, said method comprising:

providing an assembly according to claim 1;

moving the locking device from the unlocking position to the locking position with the key; and withdrawing the key from the locking device, activating the control device with the key.

9. A method for generating at least one signal for indicating the position of a locking device, said method comprising:
provided an assembly according to claim 1; and
generating at least one signal when the control device of said assembly is at least one of deactivated and activated.

* * * * *